June 4, 1968 A. SCHMIDT ET AL 3,386,892
PURIFICATION OF FLUOSILICIC ACID SOLUTION BY DISTILLATION
WITH PHOSPHORIC ACID SOLUTION
Filed June 22, 1966

INVENTORS
ALFRED SCHMIDT
WALTER MUELLER
FERDINAND WEINROTTER

BY Wendueth, Lind & Ponack
ATTORNEYS 3,386,892
PURIFICATION OF FLUOSILICIC ACID SOLUTION BY DISTILLATION WITH PHOSPHORIC ACID SOLUTION
Alfred Schmidt, Linz (Danube), Walter Müller, Leonding, near Linz (Danube), and Ferdinand Weinrotter, Linz (Danube), Austria, assignors to Osterreichische Stickstoffwerke Aktiengesellschaft, Linz (Danube), Austria
Filed June 22, 1966, Ser. No. 559,449
Claims priority, application Austria, June 22, 1965, A 5,622/65
1 Claim. (Cl. 203—42)

ABSTRACT OF THE DISCLOSURE

The continuous purification of dilute aqueous fluosilicic acid solution comprises distilling at atmospheric pressure a mixture of the solution and aqueous phosphoric acid solution, the boiling point of which mixture is at least 120° C., and continuously adding fresh dilute aqueous fluosilicic acid during the distillation in such amounts that the boiling point of the mixture of at least 120° C. is kept constant.

This invention relates to an improved method for the purification and/or concentration of aqueous fluosilicic acid solutions.

Fluosilicic acid, or silicofluoric acid ($H_2SiF_6$), is the starting substance for the manufacture of numerous other fluorine-containing compounds, such as sodium silicofluoride, ammonium fluoride, aluminum fluoride and hydrofluoric acid. In most cases the purity and concentration of the fluosilicic acid determines the feasibility and economy of preparing these other compounds.

Fluosilicic acid may be obtained in considerable quantities on digesting crude phosphates with mineral acids, especially in the manufacture of superphosphate, or on evaporation of dilute phosphoric acid solutions. The solutions of fluosilicic acid obtained in the latter case are too dilute for further processing and are practically always contaminated, so that they have to be discarded.

The behavior of fluosilicic acid on distillation is very complicated. It is known from the investigations of E. Baur, Ber., 36 (1903), p. 4215, that the vapor of fluosilicic acid decomposes almost completely into hydrogen fluoride and silicon tetrafluoride. It is futhermore known that, depending upon the concentration of the boiling fluosilicic acid, the vapor contains hydrogen fluoride and silicon tetrafluoride in a variable ratio with respect to each other. Fluosilicic acid of concentration less than 13% by weight yields a distillate which is more rich in hydrogen fluoride than would correspond to the formula $H_2SiF_6$. Fluosilicic acid of higher concentration than 13% by weight yields a distillate which is less rich in hydrogen fluoride. Furthermore water and fluosilicic acid form an azeotrope having a maximum boiling point when the concentration of fluosilicic acid is about 45% by weight, so that rectification of a more dilute acid than this results in enrichment of the acid in the base of the column.

It has now surprisingly been found that the boiling characteristics of fluosilicic acid change fundamentally if the distillation is carried out, according to this invention, in the presence of phosphoric acid, $H_3PO_4$, and if the acid mixture is kept at a boiling point of not less than about 120° C.

Accordingly, the present invention provides a method for the purification and/or concentration of a dilute aqueous fluosilicic acid solution which comprises distilling a mixture of the solution and phosphoric acid at atmospheric pressure and maintaining the boiling point of the acid mixture at at least 120° C. by adjusting the concentration of phosphoric acid and by controlling the addition or inlet rate of fluosilicic acid solution to the phosphoric acid in the evaporator. The method is preferably continuous.

It is known from U.S. Patent No. 2,369,791 that the fluorine compounds which are produce by evaporation of crude dilute phosphoric acid may be obtained in the form of a 16 to 19% strong fluosilicic acid contaminated with phosphoric acid. In order to avoid precipitation of silica by water of condensation in the waste gas pipes, the waste gas from the concentration process is in this case kept at a temperature greater than 116° C. The phosphoric acid temperature is 110° C., but due to the smoke gases from the direct heating the waste gas temperature is 116° to 121° C. The phosphoric acid has a concentration of 78 to 80% $H_3PO_4$ and its boiling point is 153° to 157° C.

In contrast, the method of the present invention serves for the purification and/or concentration of fluosilicic acid which has already been produced, and the product has a phosphoric acid content of less than 50 parts per million of phosphoric acid, as is necessary for further use. The mixture of phosphoric acid and fluosilicic acid is at the boiling point and one is therefore dealing with a normal evaporation and not with evaporation at temperatures far below the boiling point. Neither the concentration nor the composition of the phosphoric acid used is changed, and the phosphoric acid is also not consumed, so that the method of the invention is neither coupled with the manufacture of concentrated phosphoric acid nor derived from the aforementioned older process.

The present invention is advantageously carried out in an apparatus which comprises, in combination, an evaporator, a subsequent packed rectification column, means for circulating the condensate, and a reflux condenser mounted on the rectification column or following the latter, and, if desired, an additional column mounted between the rectification column and the reflux condenser.

A preferred form of the apparatus for carrying out the process of the invention is illustrated in the accompanying drawings in which.

Figure 1:
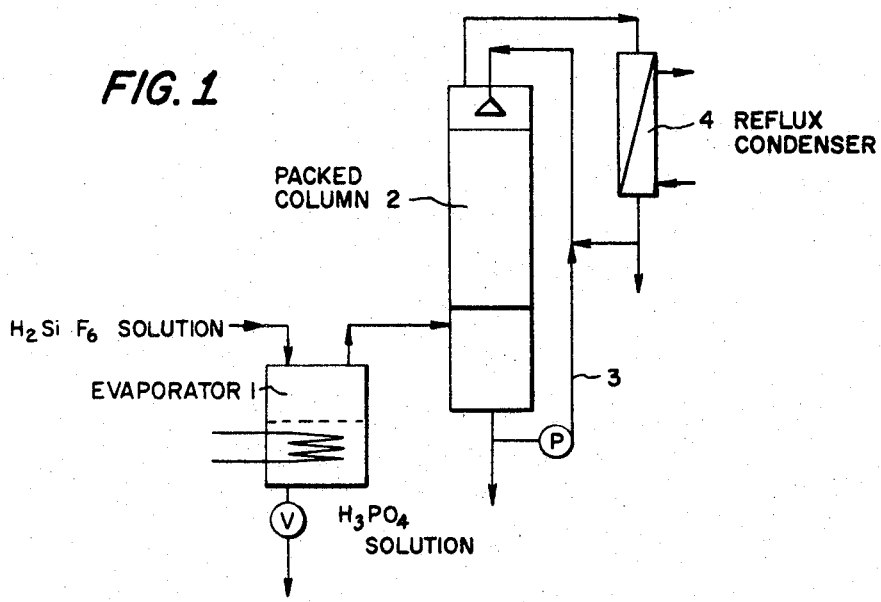
FIG. 1 is a schematic diagram of one form of the apparatus.

The apparatus itself comprises a combination of units of equipment which are individually and in themselves known in chemical technology. Referring to FIG. 1, the apparatus comprises, in combination, an evaporator 1 with a packed column 2 following the evaporator and serving to rectify the vapor, together with a device 3 for circulating the condensate, and a reflux condenser 4 mounted on the column 2 or following the column.

Figure 2:
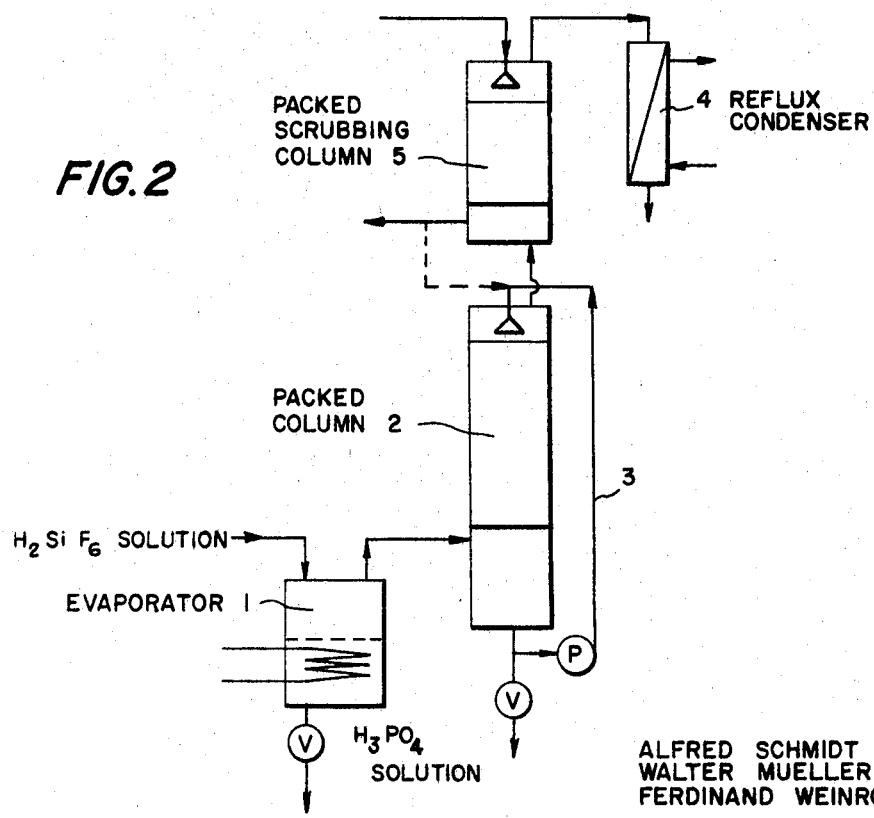
FIG. 2 is a schematic diagram of a modified form of the apparatus.

As shown in FIG. 2, an additional column 5 may be mounted, if desired, between the rectification column 2 and the reflux condenser 4.

The process of the invention will be explained in more detail with the aid of the following examples.

EXAMPLE 1

An aqueous phosphoric acid solution having a boiling point of about 120° C. (roughly 65% by weight of $H_3PO_4$) is introduced into an evaporator made of polypropylene, and heated by means of a coil made of silver through which steam is passed. Aqueous fluosilicic acid solution containing roughly 10% by weight of $H_2SiF_6$ is continuously added in amounts such that the boiling point of the phosphoric acid during the distillation is kept at roughly 120° C. A clear aqueous distillate is obtained which, like the fluosilicic acid used, contains 10% by weight of $H_2SiF_6$. The level of liquid in the evaporator remains constant during the above stage. An analysis of the contents of the evaporator indicates 64.2% by weight of $H_3PO_4$ and 3.3% by weight of fluorine. An initial slight deposition of silica in the condensate from the condenser soon ceases. It follows from this that, in the presence of phosphoric acid of about 60 to 65% by weight of concentration, fluosilicic acid can be distilled in a suitable manner and does not form an azeotrope with water.

If the boiling point of the acid mixture is lowered to 115° C. by the addition of dilute phosphoric acid at a constant rate, or by excessively rapid addition of dilute fluosilicic acid, then the contents of the evaporator, after completion of the distillation or during continuous distillation, show a phosphoric acid content of only 49.1% by weight $H_3PO_4$ and correspondingly the residue of fluorine also rises to 6.5% by weight.

Further lowering of the boiling point to 110° C. results, after distillation of 10 parts by volume of fluosilicic acid of 10% $H_2SiF_6$ by weight in the presence of 1 part by volume of initially introduced phosphoric acid, in a concentration of 35.5% by weight of $H_3PO_4$ in the content of the evaporator and an increase of the no longer distillable amount of fluorine to 9.1% by weight. A liquid containing large quantities of precipitated silica condenses in the subsequent condenser. At the same time the content of the evaporator constantly increases.

Impurities which are present in the dilute fluosilicic acid and which cannot be evaporated off, such as phosphoric acid and gypsum, become enriched in the evaporator and have to be continuously or periodically removed therefrom.

If the vapor obtained by distillation from previously introduced 60 to 65% by weight phosphoric acid is now passed to a rectification column, then the further difficulty arises that the hydrogen fluoride is first absorbed in the column and the silicon tetrafluoride only absorbed in the upper part, so that silica deposits at the head of the column and clogs the column. According to the invention the deposition of silica at the head of the rectification column which follows the evaporator is therefore prevented by circulating the fluorine-rich concentrated condensate from the bottom of the column counter-currently to the vapor coming from the evaporator, thereby resulting in an equilibration of the fluorine-content of the entire content of the column, and preventing the formation of silica at the head of the column. The excess of fluosilicic acid solution resulting from the further condensation, and increased by the reflux, is continuously withdrawn at the bottom of the column.

EXAMPLE 2

Fluosilicic acid is evaporated as described in Example 1. The vapor is introduced into a packed column in which aqueous fluosilicic acid of about 17% concentration by weight circulates. The vapors issuing at the head of the column are condensed in a condenser. A part of the condensate is introduced as a reflux at the head of the column, in order to keep the concentration of the circulating acid at 17% by weight. The following fluorine balance results:

|  | Kg./h. | Weight, Percent F | Kg. F/h. |
| --- | --- | --- | --- |
| Starting acid | 17 | 7.5 | 1.27 |
| Concentrated acid | 7.5 | 14.8 | 1.11 |
| Condensate from condenser | 9.5 | 1.4 | 0.13 |

From these figures it follows that the output of the column amounts to a yield of concentrated acid equivalent to 89.5% of the amount of fluorine employed, and that there is a loss of 10.5% in the condenser condensate.

As a result of this measure, the reflux into the column becomes enriched in fluosilicic acid so that the issuing vapor now contains silicon tetrafluoride which would normally be lost. The extent of the loss is determined by the desired concentration of the fluosilicic acid in the column. It is found that this loss amounts to less than 15% of the amount of fluorine used for concentrations of up to 18% by weight of $H_2SiF_6$ at the head of the column. However, at higher final concentrations the loss rises very rapidly so that this limits the economical use of the process. In order to avoid blockages, equipment which does not contain packing, preferably with spray washers, is used instead. However, in order to avoid the separation of silica in the subsequent scrubber and in order to be able to recover the last traces of fluorine, the vapor leaving the head of the column is washed countercurrently with an aqueous solution which can take up the silicon tetrafluoride without separation of silica. For this, a solution of fluorides, such as ammonium, sodium, potassium or aluminum fluorides, is used.

Absorption of the silicon tetrafluoride results in the corresponding silicofluorides. If these are insoluble, they precipitate and can be isolated by filtration. In other cases they are isolated by evaporation. Sometimes the simultaneous presence of such a silicofluoride in the concentrated fluosilicic acid does not interfere so that it may remain in the solution, as is the case e.g. in the manufacture of ammonium fluoride or aluminum fluoride. In other cases the silicofluoride solution is separately removed.

EXAMPLE 3

The method is carried out as in Example 2. The vapors issuing at the head of the column are scrubbed in an additional packed column in which aluminum fluoride solution circulates. The amount of this solution is, through observation, kept such that the circulating solution remains clear. The overflow from this column is returned into the first column.

The following fluorine balance results:

|  | Kg./h. | Weight, Percent F | Kg. F/h. |
| --- | --- | --- | --- |
| Starting acid | 10.7 | 10.6 | 1.13 |
| AlF₃ solution | 10.7 | 3.4 | 0.36 |
| Concentrated acid | 10.2 | 14.2 | 1.45 |
| Condensate from second condenser | 11.1 | 0.3 | 0.03 |

Thus when using this fluoride wash a yield of 98% F in the form of concentrated pure fluosilicic acid results, and there is a loss of only 2% of the fluorine employed.

Having thus disclosed the invention what is claimed is:

1. A method for the continuous purification of crude dilute aqueous fluosilicic acid solution containing approximately 65% of $H_3PO_4$ and having a boiling point of 120° C., which comprises distilling said solution at the boiling point of about 120° C. at atmospheric pressure, and continuously adding to the distilling mixture fresh crude dilute aqueous fluosilicic acid solution during said distillation in amounts such that the boiling point of the distilling mixture remains constant at about 120° C., and condensing the resultant vapors to recover a clear aqueous distillate having about the same percentage by weight of $H_2SiF_6$ as the initial crude dilute aqueous fluosilicic acid solution.

References Cited

UNITED STATES PATENTS

| 2,369,791 | 2/1945 | Moore | 23—88 |
| 2,611,681 | 9/1952 | Bellinger | 23—165 |
| 2,728,634 | 12/1955 | Miller | 23—153 X |
| 3,091,513 | 5/1963 | Parish | 23—153 |
| 3,256,062 | 6/1966 | Wylegala | 23—153 |
| 3,258,308 | 6/1966 | Peterson et al. | 23—153 X |
| 3,273,713 | 9/1966 | Parish | 23—153 |

FOREIGN PATENTS 774,319  5/1957  Great Britain.

NORMAN YUDKOFF, *Primary Examiner.*

F. E. DRUMMOND, *Assistant Examiner.*